(12) United States Patent
Herrmann et al.

(10) Patent No.: US 6,603,286 B2
(45) Date of Patent: Aug. 5, 2003

(54) BATTERY CHARGING CIRCUIT WITH UNDERVOLTAGE CURRENT CONTROL

(75) Inventors: John E. Herrmann, Sugar Hill, GA (US); Ashok R. Patil, Mumbai (IN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/027,423

(22) Filed: Dec. 23, 2001

(65) Prior Publication Data

US 2003/0117110 A1 Jun. 26, 2003

(51) Int. Cl.[7] .................................................. H02J 7/00
(52) U.S. Cl. ...................................................... 320/134
(58) Field of Search ................................. 320/134, 136, 320/139, 121, 122, 132, 137, 162, 163, 164, 108, 111, 112, 129, 138, DIG. 21

(56) References Cited

U.S. PATENT DOCUMENTS

| | | | |
|---|---|---|---|
| 5,440,221 A | 8/1995 | Landau et al. | 320/155 |
| 5,581,170 A | 12/1996 | Mammano et al. | 320/116 |
| 5,825,159 A | 10/1998 | Patino | 320/125 |
| 5,847,544 A * | 12/1998 | Eguchi | 320/136 |
| 5,929,593 A * | 7/1999 | Eguchi | 320/139 |

OTHER PUBLICATIONS

NCP802 Data Sheet—Highly Integrated Lithium Battery Protection Circuit for One Cell Battery Packs on Semiconductor Corporation, Oct., 2001, Rev. 4. Publication Order No. NCP802/D, Downloadable 47 www.onsemi.com/pub/Collateral/NCP802-D.PDF.

* cited by examiner

Primary Examiner—Edward H. Tso
Assistant Examiner—Pia Tibbits
(74) Attorney, Agent, or Firm—Philip H. Burrus, IV

(57) ABSTRACT

This invention includes a charging circuit employing an off-the-shelf battery protection circuit. The invention offers an improvement to the battery protection circuit by providing means to accommodate trickle charging during undervoltage conditions. A pass transistor is provided with a trickle resistor coupled in parallel. The pass transistor is driven by a drooping voltage circuit that causes the pass transistor to open in undervoltage conditions, thus forcing charging current through the trickle resistor. Indicating means are also included to tell the user whether the circuit is in trickle mode or normal charging mode.

5 Claims, 2 Drawing Sheets

-PRIOR ART-

BATTERY CHARGING CIRCUIT WITH UNDERVOLTAGE CURRENT CONTROL

BACKGROUND

1. Technical Field

This invention relates generally to battery charging and protection circuits, and more specifically to battery charging circuits incorporating a trickle charge during battery undervoltage conditions.

2. Background Art

Battery protection circuits are well known in the art. Protection circuits for rechargeable cells are prolific in battery packs employing lithium-ion and lithium polymer cells. When rechargeable cells are charged, the voltage of the cell rises. Lithium-based rechargeable cells typically have a maximum termination voltage of 4.1 or 4.2 volts. This means that if a lithium-based battery is charged beyond the termination voltage—known as an "overvoltage condition" the reliability of the cell may be compromised. Most lithium battery protection circuits known in the art sense the voltage of the cell and terminate charging by opening a switch when the cell reaches the proper termination voltage.

There is another condition, known as an "undervoltage condition", when the cell voltage drops below it's recommended operating point. For a typical lithium-ion cell, this voltage is about 2.5 volts. When the voltage drops below this level, possibly due to over discharge, cell manufacturers suggest that rapid charging may damage the cell. Consequently, the battery must be slowly charged until it reaches the minimum operational threshold. The slow charging current, often called a "trickle current" is on the order of a few hundred milliamps. Once the minimum threshold is reached, a full charging current, like 1 amp for example, may be applied until the maximum termination voltage is reached.

There is thus a need for a compact, low-cost charging circuit that accommodates trickle charging for undervoltage conditions, as well as terminating charging prior to an overvoltage condition occurring.

DETAILED DESCRIPTION OF THE INVENTION

Figure 1:
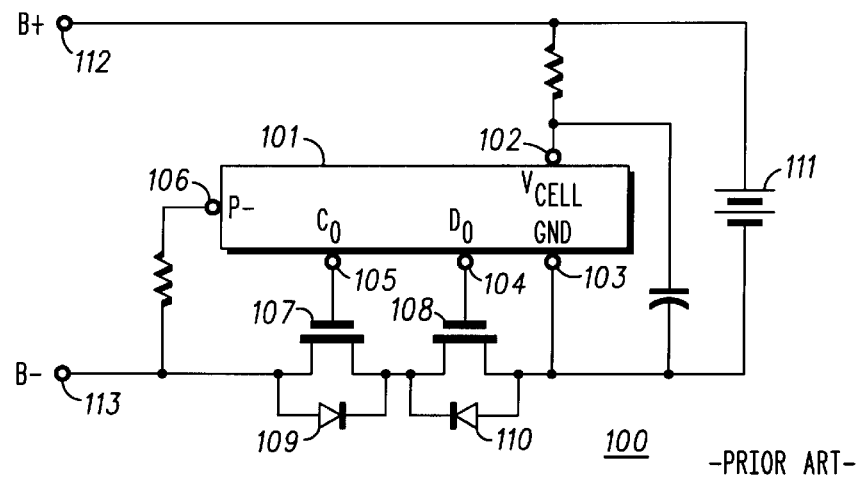
FIG. 1 is an illustration of a prior art protection circuit 100.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Cell protection circuits available on the market today provide termination of charging when the voltage of a rechargeable cell reaches a predetermined threshold. One such protection circuit includes the NCP802 manufactured by OnSemiconductor. The data sheet and application notes for this part may be found at www.onsemi.com/pub/Collateral/NCP802-D.PDF. This invention incorporates such a protection device and further provides a circuit that facilitates trickle charging during undervoltage conditions. While the NCP802 integrated circuit (IC) will be used herein for exemplary purposes, it will be clear to those of ordinary skill in the art that other protection circuits having similar characteristics are interchangeable with the NCP802.

Referring now to FIG. 1, illustrated therein is a prior art protection circuit 100. The circuit 100 includes a protection control IC 101 like the NCP802. Protection circuits of this type typically have at least 5 terminals: A voltage sensing terminal 102 and corresponding ground terminal 103 to sense the voltage of the cell; a charge control pin 105 and a discharge control pin 104; and a negative input pin 6. Terminals B+ 112 and B− 113 are typically coupled to either a power source or load for charging and discharging the cell 111.

The charge control pin 105 and the discharge control pin 104 typically control a charge transistor 107 and a discharge transistor 108. Metal oxide semiconductor field effect transistors (MOSFET) are typically used due to their low impedance in the saturation mode. Two transistors are required because each MOSFET has a corresponding parasitic body diode 109,110 due to its manufacture. Consequently, each MOSFET 107, 108 can only prevent current from flowing in a single direction. The body diodes 109,110 allow the current to flow in the other direction. To stop all current flow, therefore, both MOSFETs 107,108 must be turned off. Thus the need for a charge control pin 105 and a discharge control pin 104. The negative input pin 106 is provided to connect to excess current detectors. It also serves as a common node for the charge control pin 105 when the MOSFETs 107,108 are open.

The operation of the circuit 100 is as follows: When the voltage across the voltage sensing terminal 102 and corresponding ground 103 increases above a predetermined threshold, the charge control pin 105 is actuated, thereby opening the charge transistor 109. Discharge of the cell 111 is still allowed through the parasitic diode 109, but no current can flow in the charging direction, which corresponds to current flowing from + to − in the cell 111. When an undervoltage situation is sensed across the voltage sense pin 102 and corresponding ground 103, the discharge control pin 104 is actuated, thereby opening the discharge transistor 108. Charging current may still flow through the parasitic diode 110, but no discharge current may flow. The transistors 107,108 return to their closed positions when the cell voltage reenters it's operational voltage range. The IC 101 may include hysteresis across these transitions.

Figure 2:
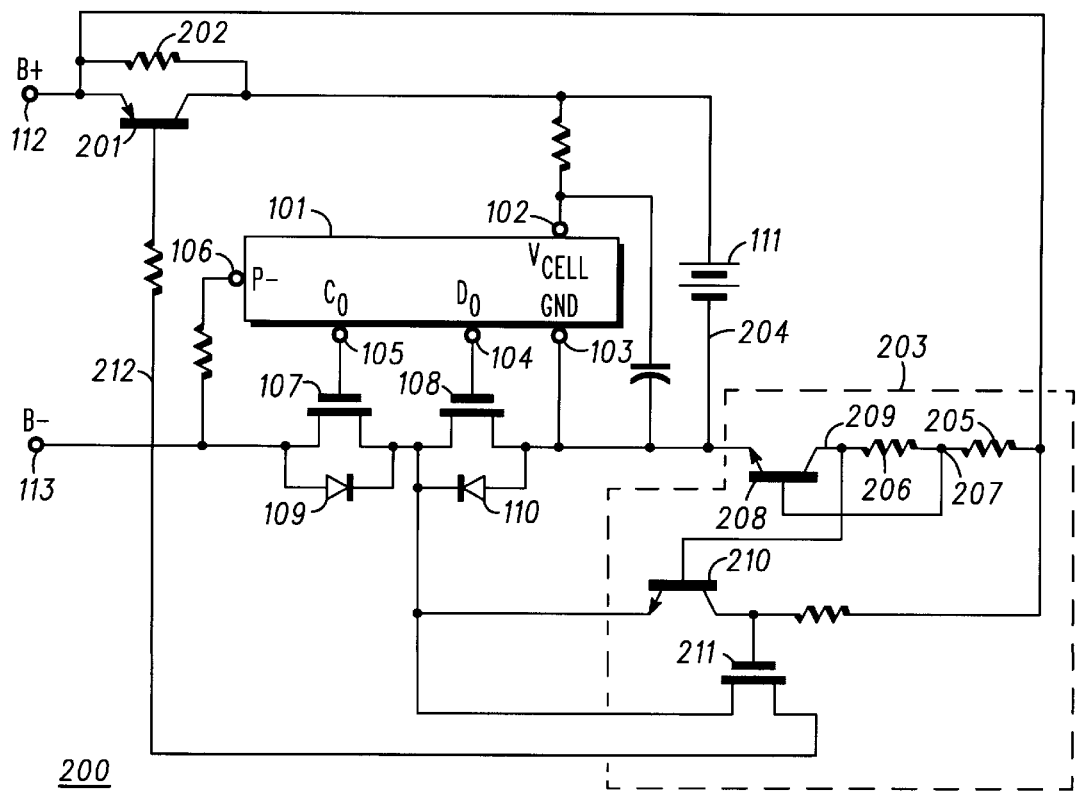
FIG. 2 is an illustration of one preferred embodiment of a charging circuit that facilitates trickle charging during undervoltage conditions in accordance with the invention.

Referring now to FIG. 2, illustrated therein is one preferred embodiment of a charging circuit 200 that facilitates trickle charging during undervoltage conditions in accordance with the invention. As stated above, the protection IC 101 itself turns the charge and discharge transistors 107,108 either completely on or completely off. As also stated, manufacturers of cells suggest that when the cell 111 is in an undervoltage condition, it is desirable to reduce the charging current to a trickle level. The invention accommodates this by including a pass transistor 201 and a trickle resistor 202 in series with the cell 111. The pass transistor 201 is driven by a "drooping voltage" source 203.

In its simplest embodiment, the circuit senses a voltage across parasitic diode 110 when the discharge transistor 108 is open. This may be accomplished in a number of ways, including using operational amplifiers to sense the voltage, single transistors and the like. The voltage droop circuit 203 has advantages in that it is capable of more accurately sensing voltage changes in the parasitic diode 110. Additionally, it is capable of sensing smaller voltages that other circuits.

When the cell 111 is operating within it's operational voltage range, the pass transistor 201 is in the fully saturated mode and is conducting current. If the cell 111 is in an undervoltage condition, however, the discharge transistor 108 opens. While current may still flow through the parasitic diode 110 for charging, the impedance of the charge path 204 increases. This causes current to begin flowing through resistors 205 and 206, thereby reducing the voltage at node 207, causing transistor 208 to turn off.

When transistor 208 turns off, the voltage at node 209 increases, causing transistor 210 to turn on, thereby causing transistor 211 to turn on. This pulls the voltage of node 212 to be pulled down, causing the pass transistor 201 to turn off. Once the pass transistor 201 is turned off, the only path for current to flow to the cell is through the trickle resistor. By increasing the resistance of the trickle resistor, the charging current may be reduced to the trickle level.

The circuit thus opens the pass transistor 201 during undervoltage conditions, reducing the charging current to a trickle level through trickle resistor 202. Once the cell 111 reaches it's minimum threshold level, the pass transistor 201 turns back on to allow charging at the normal rate.

Figure 3:
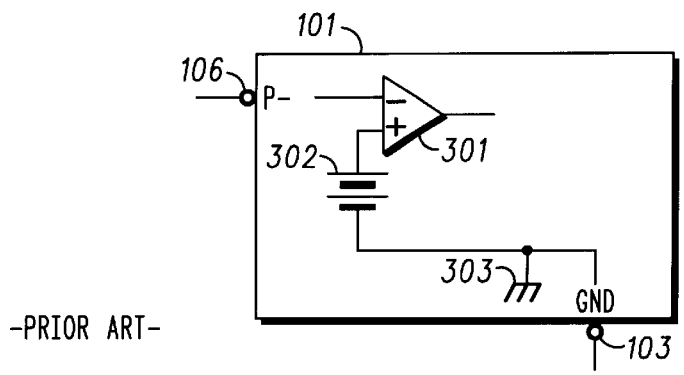
FIG. 3 shows an internal schematic diagram of the NCP802 protection integrated circuit.

Referring now to FIG. 3, illustrated therein is an internal schematic diagram of the NCP802 protection IC 101. The negative input pin 106 is internally coupled to the negative input an operational amplifier (op-amp) 301. The positive input 301 is coupled to a voltage reference 302 from the ground pin 103 and the chassis reference 303. When an external short between the negative input pin 106 and the ground pin 103 is removed—by opening the discharge transistor for example—the virtual short of the op-amp will cause the negative input pin 106 to float above the chassis reference 303 to the value of the voltage reference 302.

Figure 4:
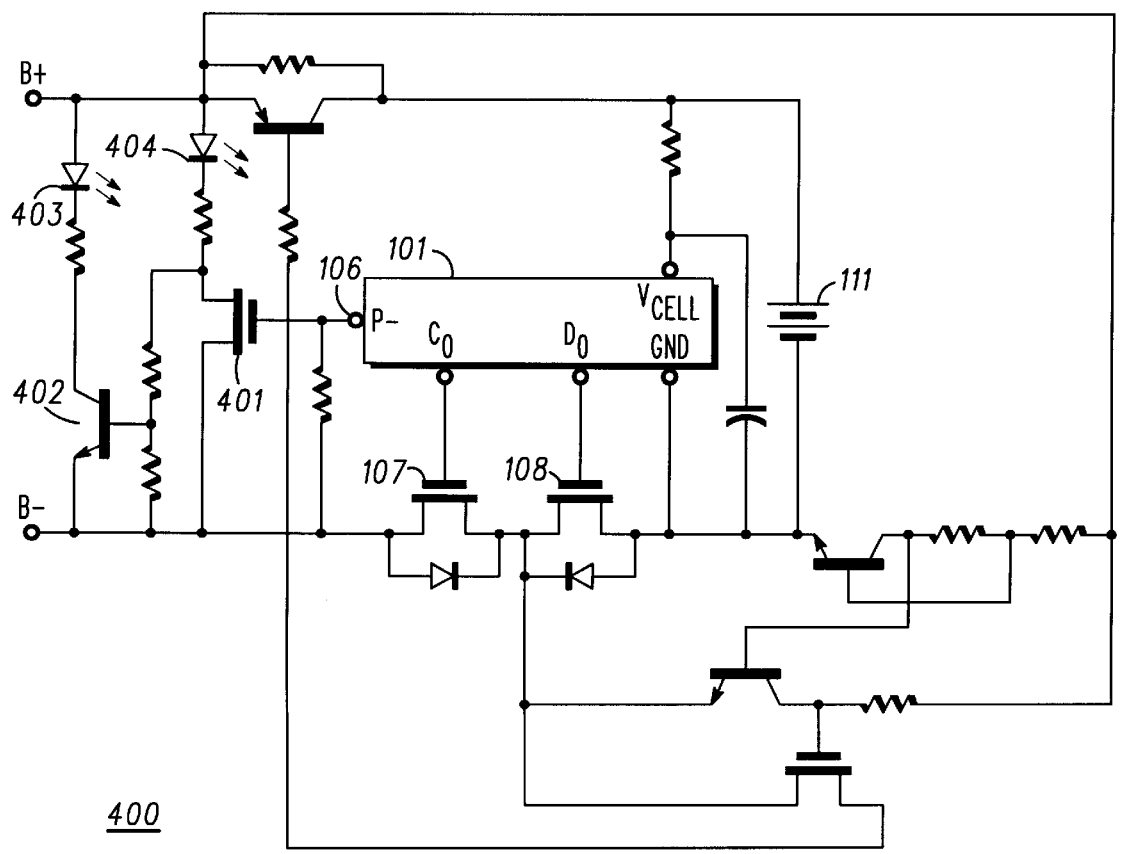
FIG. 4 is an illustration of an indication charging circuit that provides charging status notice to the user in accordance with the invention.

Referring now to FIG. 4, illustrated therein is an indication charging circuit 400 that takes advantage of the virtual short of the internal op-amp. When the circuit 400 is in normal operation, e.g. when the cell 111 is within it's normal operation range, the transistors 107,108 are closed and the negative input pin 106 is pulled to ground. In this circuit 400, the negative input pin 106 is employed as an output by coupling the negative input pin to a MOSFET transistor. As the negative input pin 106 is effectively tied low, MOSFET 401 is off, and transistor 402 is on, causing current to flow through a first light emitting diode (LED) 403, thereby indicating normal charge.

When either the discharge transistor 108 opens, however, the negative input 106 is pulled up to the internal reference voltage, thereby causing transistor 401 to turn on. This actuation causes transistor 402 to turn off. Current in thereby directed through a second LED 404, thereby indicating trickle charge mode.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the NCP802 has been used as an example, any other protection device with similar characteristics may be used in its stead.

What is claimed is:

1. In a battery protection circuit having at least one rechargeable cell, a voltage sensing means, a charge control transistor and a discharge control transistor, the improvement comprising:

a. a pass transistor coupled serially with the at least one rechargeable cell;

b. a trickle resistor coupled in parallel with the pass transistor; and c. a drooping voltage circuit coupled to the protection circuit;

wherein when the discharge transistor opens, the drooping voltage circuit causes the pass transistor to open, thereby causing any charging current to flow through the trickle resistor.

2. The improvement of claim 1, wherein the drooping voltage circuit comprises:

a. a resistive divider having a central node, the resistive divider coupled in parallel across the serial combination of the pass transistor, the at least one rechargeable cell and the discharge transistor, b. A first transistor having a first control pin, the first transistor coupled serially with the resistive divider, with the first control pin coupled to the central node of the resistive divider; and c. A second transistor having a second control pin, second transistor being coupled to the pass transistor, the second control pin being coupled between the resistive divider and the first transistor;

wherein when the discharge transistor opens, the first transistor actuates, thereby actuating the second transistor.

3. The improvement of claim 1, the protection circuit further comprising a negative input pin having at least a first state and a second state, where the negative input pin is effectively coupled to a voltage reference, the improvement further comprising:

a. a first transistor coupled to the negative input pin;

b. a first indicating means coupled to the first transistor, the first indicating means responsive to the first transistor;

c. a second transistor coupled to the first transistor, the second transistor being responsive to the first transistor;

d. a second indicating means coupled to the second transistor, the second indicating means responsive to the second transistor;

wherein when the negative input pin is in a first state the first indicating means is actuated, and wherein when the negative input pin is in the second state the second indicating means is actuated.

4. The improvement of claim 3, wherein the drooping voltage circuit comprises:

a. a resistive divider having a central node, the resistive divider coupled in parallel across the serial combination of the pass transistor, the at least one rechargeable cell and the discharge transistor;

b. A first transistor having a first control pin, the first transistor coupled serially with the resistive divider, with the first control pin coupled to the central node of the resistive divider; and c. A second transistor having a second control pin, second transistor being coupled to the pass transistor, the second control pin being coupled between the resistive divider and the first transistor;

wherein when the discharge transistor opens, the first transistor actuates, thereby actuating the second transistor.

5. The improvement of claim 1, wherein the battery protection circuit comprises a NCP802 battery protection integrated circuit.

* * * * *